United States Patent
Son et al.

(10) Patent No.: US 8,879,572 B2
(45) Date of Patent: Nov. 4, 2014

(54) METHOD AND APPARATUS FOR RECOGNIZING MULTICAST AND BROADCAST SERVICE REGION IN BROADBAND WIRELESS COMMUNICATION SYSTEM

(75) Inventors: Yeong-Moon Son, Yongin-si (KR); Jae-Jeong Shim, Seongnam-si (KR); Ji-Yun Seol, Seongnam-si (KR); Ae-Ri Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 12/504,129

(22) Filed: Jul. 16, 2009

(65) Prior Publication Data

US 2010/0014462 A1    Jan. 21, 2010

(30) Foreign Application Priority Data

Jul. 17, 2008  (KR) .................. 10-2008-0069534
Aug. 5, 2008  (KR) .................. 10-2008-0076405

(51) Int. Cl.
*H04L 12/28* (2006.01)
*H04B 7/212* (2006.01)
*H04L 12/43* (2006.01)
*H04J 3/00* (2006.01)
*H04W 72/00* (2009.01)

(52) U.S. Cl.
CPC .................. *H04W 72/005* (2013.01)
USPC ............ 370/431; 370/444; 370/461; 370/476

(58) Field of Classification Search
CPC .................................... H04W 4/00
USPC .................. 370/431–454, 461, 474–476
See application file for complete search history.

(56) References Cited

U.S. PATENT DOCUMENTS

| | | | |
|---|---|---|---|
| 2005/0245262 A1* | 11/2005 | Moon et al. | 455/436 |
| 2006/0087994 A1* | 4/2006 | Barth et al. | 370/310 |
| 2006/0211436 A1* | 9/2006 | Paila et al. | 455/509 |
| 2006/0239264 A1 | 10/2006 | Kang et al. | |
| 2007/0253367 A1* | 11/2007 | Dang et al. | 370/329 |
| 2007/0280291 A1* | 12/2007 | Beser | 370/468 |
| 2008/0036909 A1* | 2/2008 | Paila | 348/461 |
| 2008/0205322 A1* | 8/2008 | Cai et al. | 370/312 |

FOREIGN PATENT DOCUMENTS

| | | |
|---|---|---|
| KR | 10-2006-0065790 A | 6/2006 |
| KR | 10-2006-0091132 A | 8/2006 |
| KR | 10-2006-0111864 A | 10/2006 |
| KR | 10-2008-0058693 A | 6/2008 |

* cited by examiner

*Primary Examiner* — Brandon Renner
(74) *Attorney, Agent, or Firm* — Jefferson IP Law, LLP

(57) ABSTRACT

A method and an apparatus for recognizing a Multicast and Broadcast Service (MBS) region in a broadband wireless communication system are provided. In the method, whether a next MBS MAP message transmission point of a first frame and an MBS data burst transmission point indicated by MBS burst assignment information of a second frame match with each other in a third frame is determined. When matching with each other in the third frame, a control message including information for determining a starting point of an MBS region is generated. The generated control message is transmitted during one of the first and second frames.

16 Claims, 7 Drawing Sheets

METHOD AND APPARATUS FOR RECOGNIZING MULTICAST AND BROADCAST SERVICE REGION IN BROADBAND WIRELESS COMMUNICATION SYSTEM

PRIORITY

This application claims the benefit under 35 U.S.C. §119 (a) of a Korean patent application filed in the Korean Intellectual Property Office on Jul. 17, 2008and assigned Serial No. 10-2008-0069534 and a Korean patent application filed in the Korean Intellectual Property Office on Aug. 5, 2008 and assigned Serial No. 10-2008-0076405, the entire disclosures of both of which are hereby incorporated by reference.

BACKGROUND OF THE INVENTION

1. Field of the Invention

The present invention relates to a Multicast and Broadcast Service (MBS) in a wireless communication system. More particularly, the present invention relates to a method and an apparatus for recognizing an MBS region by an MBS Daisy-Chain mechanism in a broadband wireless communication system.

2. Description of the Related Art

In a $4^{th}$ Generation (4G) communication system, which is the next generation communication system, research for providing users with services having various Quality of Services (QoS) using a transmission speed of about 100 Mbps are under active progress. More particularly, research for supporting a high speed service in the form of guaranteeing a Broadband Wireless Access (BWA) communication system such as a wireless Local Area Network (LAN) system and a wireless Metropolitan Area Network (MAN) system, mobility and QoS are under active progress. Also, for a representative communication system, there exists the Institute of Electrical and Electronics Engineers (IEEE) 802.16 system.

The IEEE 802.16-based broadband wireless communication system provides the Internet, Voice over Internet Protocol (VoIP), and a non-real time streaming service as a primary service. Also, recently, a Multicast Broadcast Service (MBS), which is a real-time broadcast service, has emerged as a new service. More particularly, in the MBS, a plurality of base stations transmit broadcast data bursts which use the same coding scheme via the same frequency and time resources, so that even a terminal located in a cell edge may obtain a macro diversity effect through Radio Frequency (RF) combining.

FIG. 1 illustrates a DownLink (DL) frame structure for providing an MBS in a conventional broadband wireless communication system.

As illustrated in FIG. 1, to support the macro diversity, a plurality of base stations define a portion of a frame as an MBS region 150, and transmit MBS data bursts 111, 113 and 115 via the MBS region 150. Here, the location of the MBS region is transferred via a DL MAP message 103. The DL MAP message 103 includes MBS_MAP_IE 105. The MBS_MAP_IE 105 includes the location information of an MBS MAP message 107 including assignment information of the MBS data bursts 111 to 115. Accordingly, a terminal recognizes the location of the MBS MAP message 107 through the DL MAP message 103, and recognizes the location of an MBS region 150 and the location and coding information of the MBS data bursts 111 to 115 inside the MBS region 150 through the MBS MAP message 107, thereby receiving the MBS data bursts 111 to 115.

In other words, to receive MBS data bursts 111 to 115, a relevant terminal decodes MBS_MAP_IE 105 included in the DL MAP message 103, decodes the MBS MAP message 107 using the decoded MBS_MAP_IE 105, and recognizes the location and coding information of the MBS data bursts 111 to 115 using MBS_DATA_IE 109 included in the MBS MAP message 107.

When various kinds of MBS MAP information and MBS MAP messages are transmitted every frame to decode the MBS data bursts 111 to 115, overhead may be generated. To reduce this overhead, an MBS DaisyChain mechanism may be used. The MBS DaisyChain mechanism may decode only the MBS MAP message 107 to receive an MBS data burst without decoding the DL MAP message 103.

However, on the assumption that an MBS data burst location and the starting point of the MBS region match each other, when, in the MBS DaisyChain mechanism, an MBS region through which transmission is made according to the transmission periods of MBS data bursts and an MBS MAP message for different MBS data bursts exist simultaneously, MBS regions do not match with each other at a terminal. Accordingly, the MBS DaisyChain mechanism may not properly receive MBS data bursts.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for recognizing an MBS region in a broadband wireless communication system.

Another aspect of the present invention is to provide a method and an apparatus for addressing an MBS region mismatch caused by an MBS DaisyChain mechanism in a broadband wireless communication system.

Still another aspect of the present invention is to provide a method and an apparatus for configuring an MBS MAP message in order to address an MBS region mismatch in a broadband wireless communication system.

Yet another aspect of the present invention is to provide a method and an apparatus for configuring MBS DATA IE in order to address an MBS region mismatch in a broadband wireless communication system.

In accordance with an aspect of the present invention, a method for operating a base station in order to recognize a Multicast and Broadcast Service (MBS) region in a broadband wireless communication system is provided. The method includes determining whether a next MBS MAP message transmission point of a first frame and an MBS data burst transmission point indicated by MBS burst assignment information of a second frame match with each other in a third frame, when matching with each other in the third frame, generating a control message including information for determining a starting point of the MBS region, and transmitting the generated control message during one of the first and second frames.

In accordance with another aspect of the present invention, a method for operating a terminal in order to recognize an MBS region in a broadband wireless communication system is provided. The method includes receiving an MBS MAP message indicating a location of an MBS data burst from a base station during a relevant frame period, extracting information for determining a starting point of the MBS region from the received MBS MAP message, determining the starting point of the MBS region from a relevant frame using the extracted information, and decoding the MBS MAP message from the starting point of the MBS region to receive an MBS data burst.

In accordance with still another aspect of the present invention, a base station apparatus for recognizing an MBS region in a broadband wireless communication system is provided. The apparatus includes a scheduler for determining whether a next MBS MAP message transmission point of a first frame and an MBS data burst transmission point corresponding to MBS_DATA_IE of a second frame match with each other in a third frame, a message generator for, when matching with each other in the third frame, generating a control message including information for determining a starting point of the MBS region, and a transmitter for transmitting the generated control message during one of the first and second frames.

In accordance with yet another aspect of the present invention, a terminal apparatus for recognizing an MBS region in a broadband wireless communication system is provided. The apparatus includes a receiver for receiving an MBS MAP message indicating a location of an MBS data burst from a base station during a relevant frame period, a message reader for extracting information for determining a starting point of the MBS region from the received MBS MAP message, and a controller for determining the starting point of the MBS region from a relevant frame using the extracted information, wherein the receiver decodes the MBS MAP message from the starting point of the MBS region to receive the MBS data burst.

In accordance with further another aspect of the present invention, a method for operating a base station in order to recognize an MBS region in a broadband wireless communication system is provided. The method includes determining whether a next MBS MAP message transmission point of a first frame and an MBS data burst transmission point indicated by MBS burst assignment information of a second frame match with each other in a third frame, and when they match with each other in the third frame, incorporating decoding of information indicating a DownLink (DL) MAP message of the third frame into the MBS burst assignment information of the second frame, and transmitting the MBS burst assignment information.

In accordance with still further another aspect of the present invention, a method for operating a base station in order to recognize an MBS region in a broadband wireless communication system is provided. The method includes determining whether a next MBS MAP message transmission point of a first frame and an MBS data burst transmission point indicated by MBS burst assignment information of a second frame match with each other in a third frame, and when they match with each other in the third frame, incorporating an offset value indicating a starting point of the MBS region into the MBS burst assignment information of the second frame, and transmitting the MBS burst assignment information.

In accordance with yet further another aspect of the present invention, a method for operating a base station in order to recognize an MBS region in a broadband wireless communication system is provided. The method includes determining whether a next MBS MAP message transmission point of a first frame and an MBS data burst transmission point indicated by MBS burst assignment information of a second frame match with each other in a third frame, and when they match with each other in the third frame, generating offset information from a DL subframe to a starting point of the MBS region for each MBS Burst Frame Offset in an MBS MAP message of the second frame, and transmitting the MBS MAP message.

In accordance with still yet further another aspect of the present invention, a method for operating a terminal in order to recognize an MBS region in a broadband wireless communication system is provided. The method includes determining whether information indicating decoding of a DL MAP message exists while receiving an MBS burst using MBS DaisyChain, and when the information indicating the decoding of the DL MAP message exists, decoding the DL MAP message to determine the MBS region.

In accordance with still another aspect of the present invention, a method for operating a terminal in order to recognize an MBS region in a broadband wireless communication system is provided. The method includes determining whether an offset indicating a starting point of an MBS region exists in MBS burst assignment information while receiving an MBS burst using MBS DaisyChain, and determining the starting point of the MBS region using the offset.

In accordance with still another aspect of the present invention, a method for operating a terminal in order to recognize an MBS region in a broadband wireless communication system is provided. The method includes determining whether exists offset information from a DL subframe to a starting point of an MBS region for each MBS Burst Frame Offset while receiving an MBS burst using MBS DaisyChain, determining an offset indicating a starting point of the MBS region in MBS burst assignment information for each MBS Burst Frame Offset depending on whether the offset information exists, and determining the starting point of the MBS region using the offset for each MBS Burst Frame Offset.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for providing a broadcast service in a cellular wireless communication system. More particularly, exemplary embodiments of the present invention provide a method for reducing overhead caused by an MBS MAP message.

Here, the broadcast service may be called a MultiCast and BroadCast Service (MCBCS), a Multicast and Broadcast Service (MBS), a Multimedia Broadcast and Multicast Service (MBMS), a BroadCast/MultiCast Service (BCMCS), Digital Multimedia Broadcasting (DMB), or MediaFLO depending on the standards group or an operator.

In the description below, the title of a Network Entity or Network Element (NE) is defined depending on a relevant function, and may change depending on the standards group or an operator. For example, a Base Station (BS) may be called an Access Point (AP), a Radio Access Station (RAS), or a Node-B. Also, a base station controller may be called a Radio Network Controller (RNC), a Base Station Controller (BSC), an Access Control Router (ACR), or an Access Service Network-GateWay (ASN-GW).

Hereinafter, an Orthogonal Frequency Division Multiplexing/Orthogonal Frequency Division Multiple Access (OFDM)/(OFDMA)-based broadband wireless communication system is illustrated by way of example. Note that the present invention is applicable to any wireless communication system that provides a broadcast service regardless of scheme.

Figure 1:
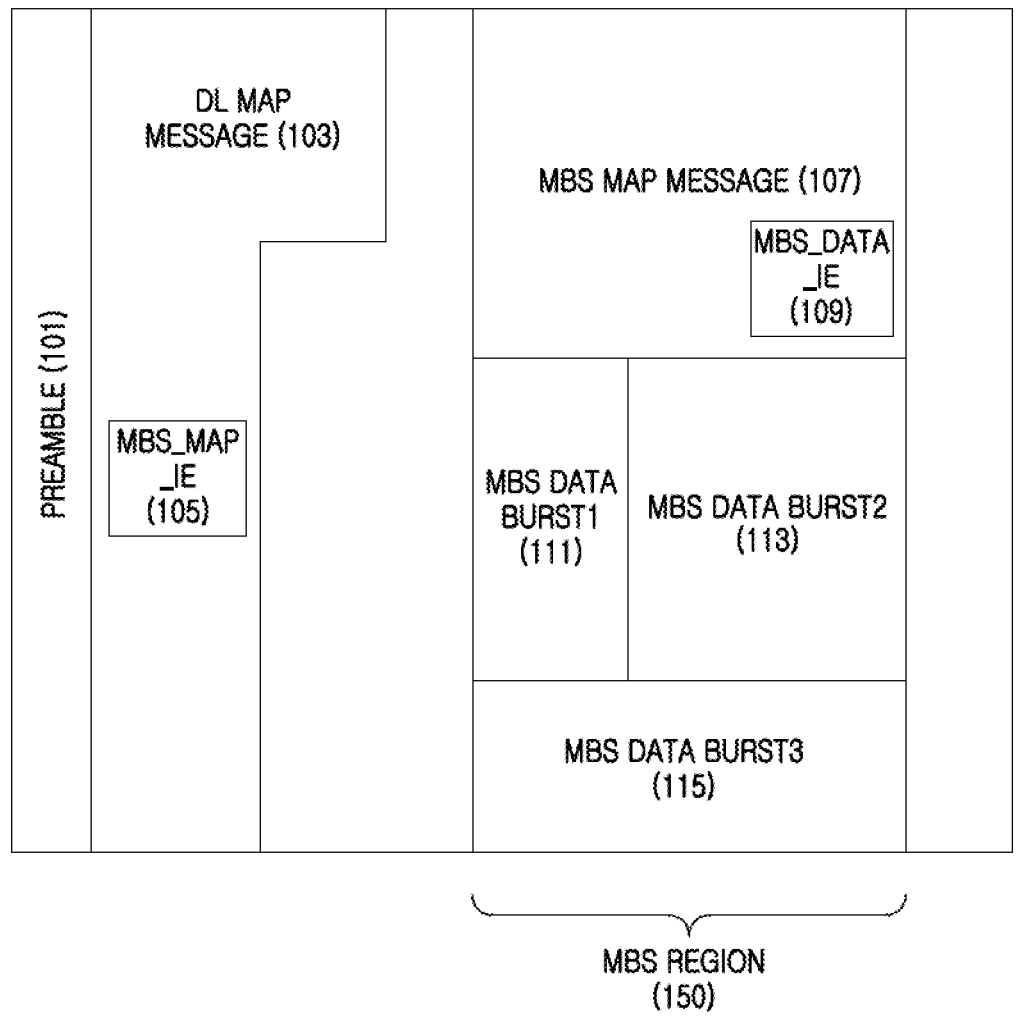
FIG. 1 illustrates an example of a frame structure for providing MBS in a conventional broadband wireless communication system.

The format of MBS MAP IE 105 of FIG. 1 is given by Table 1 below.

TABLE 1

| Table 1 Syntax | size (bits) | Notes |
|---|---|---|
| MBS_MAP_IE( ) { | | |
| Extended DIUC | 4 | MBS_MAP = 0x0A |
| Length | 4 | |
| MBS Zone Identifier | 7 | MBS Zone identifier corresponds to the identifier provided by the BS at connection initiation |
| Macro diversity enhanced | 1 | 0 = Non Macro diversity enhanced zone<br>1 = Macro diversity enhanced zone |
| If (Macro diversity enhanced=1) { | | |
| Permutation | 2 | 0b00 = PUSC permutation<br>0b01 = FUSC permutation<br>0b10 = Optional FUSC permutation<br>0b11 = Adjacent subcarrier permutation |
| Idcell | 6 | |
| } | | |
| OFDMA symbol offset | 7 | OFDMA symbol offset with respect to start of the MBS region |
| DIUC change indication | 1 | Used to indicate DIUC change is included |
| If (DIUC change indication=1) { | | |
| Reserved | 1 | |
| Boosting | 3 | |
| DIUC | 4 | |
| No. subchannels | 6 | |
| No. OFDMA symbols | 2 | |
| Repetition coding indication | 2 | 0b00 = No repetition coding<br>0b01 = repetition coding of 2 used<br>0b10 = repetition coding of 4 used<br>0b11 = repetition coding of 6 used |
| } else { | | |
| DIUC | 4 | |
| CID | 12 | 12 LSB of CID |
| OFDMA symbol offset | 8 | The offset of the OFDMA symbol in which the burst starts, measured in OFDMA symbols from beginning of the downlink frame in which the DL-MAP is transmitted. |
| Subchannel offset | 6 | The lowest index OFDMA subchannel used for carrying the burst, starting from subchannel 0. |

TABLE 1-continued

| Table 1 Syntax | size (bits) | Notes |
| --- | --- | --- |
| Boosting | 3 | |
| SLC_3_Indication | 1 | Used to notify sleep mode class 3 is used for single BS MBS service |
| No. OFDMA symbols | 6 | |
| No. subchannels | 6 | |
| Repetition coding indication | 2 | 0b00 = No repetition coding<br>0b01 = Repetition coding of 2 used<br>0b10 = Repetition coding of 4 used<br>0b11 = Repetition coding of 6 used |
| If (SLC_3_Indication=0) { | | |
| Next MBS frame offset | 8 | The Next MBS frame offset value is lower 8 bits of the frame number in which the BS shall transmit the next MBS frame. |
| Next MBS OFDMA symbol offset | 8 | The offset of the OFDMA symbol in which the next MBS zone starts, measured in OFDMA symbols from the beginning of the downlink frame in which the MBS-MAP is transmitted. |
| }<br>}<br>If (byte boundary) {<br>Padding nibble<br>}<br>} | Variable | Padding to reach byte boundary |

In Table 1, MBS Zone identifier indicates a relevant MBS region identifier and OFDMA Symbol Offset indicates a start offset of an MBS MAP message 107 existing in an MBS region 150. This offset denotes Symbol Offset in a frame. The starting point of the MBS MAP message 107 denotes the starting point of the MBS region 150. That is, the MBS MAP message 107 should always be located at the starting point of the MBS region 150.

Information after Downlink Interval Usage Code (DIUC) change indication includes size information of the MBS MAP message 107 and information required for decoding the MBS MAP message 107.

The MBS region 150 includes the MBS MAP message 107 including MBS_Data_IE 109, and MBS data bursts 111, 113, and 115.

The MBS MAP message 107 includes information required for a terminal, which receives an MBS service, to decode the location of an MBS data burst and the data burst. The format of the MBS MAP message 107 is given by Table 2 below.

TABLE 2

| Table 2 Syntax | Size (bits) | Notes |
| --- | --- | --- |
| MBS-MAP Message format ( ) { | | |
| MAC Generic Header | 48 | 6 bytes |
| Management message type=62 | 4 | |
| Frame number | 4 | The frame number is identical to the frame number in the DL-MAP |
| MBS_DIUC_Change_Count | 8 | |
| #MBS_DATA_IE | 4 | Number of included MBS_DATA_IE |
| For (i=0; i<n;i++) { | | n = #MBS_DATA_IE |
| MBS_DATA_IE | Variable | |
| } | | |
| #MBS_DATA_Time_Diversity_IE | 4 | Number of included MBS_DATA_Time_Diversity_IE |
| For (i=0;i<m;i++) { | | m = #MBS_DATA_Time_Diversity_IE |
| MBS_DATA_Time_Diversity_IE | Variable | |
| } | | |
| If (byte boundary) { | | |
| Padding nibble | 8 | |
| } | | |
| TLV encoding element | | |
| } | | |

In Table 2, an MBS MAP message includes a plurality of IEs (i.e., a Management message type indicating a message type to be transmitted), a frame number, and MBS data burst information as well as a Media Access Control (MAC) generic header. The frame number is the same as the frame number of a DL-MAP, and MBS DIUC Change Count informs whether an MBS data burst profile is the same as a previous MBS data burst profile. If MBS DIUC Change Count has changed, a subscriber terminal should receive DL burst profile information included in the form of Type-Length-Value (TLV) of the MBS MAP message 107. Alternatively, if the DL burst profile information is not included in the MBS MAP message 107, a terminal should receive the DL burst profile information through the next Downlink Channel Descriptor (DCD) message. MBS_DATA_IE 109 and MBS_

DATA_Time_Diversity_IE (not shown) indicate MBS data burst information to be received by a terminal. That is, MBS_DATA_IE 109 indicates information of regions 111, 113, and 115 to which the MBS data bursts of FIG. 1 are transmitted. MBS_DATA_Time_Diversity_IE is similar to MBS_DATA_IE 109 and includes MBS data burst information assigned in the case where only an MBS data burst for a terminal supporting Hybrid Automatic Repeat Request (H-ARQ) exists.

The format of MBS_DATA_IE 109 of FIG. 1 is given by Table 3 below.

TABLE 3

| Table 3 Syntax | Size (bits) | Notes |
| --- | --- | --- |
| MBS_DATA_IE { | | |
| MBS_MAP_Type = 0 | 4 | MBS_DATA_IE |
| MBS Burst Frame Offset | 2 | This indicates the burst located by this IE will be shown after MBS Burst Frame Offset + 2 frames. |
| Next MBS MAP change indication | 1 | This indicates whether the size of MBS MAP message of next MBS frame for these multicast CIDs included this IE will be different from the size of this MBS MAP message. |
| No. of Multicast CID | 3 | |
| For (i=0; i<No. of Multicast CIDs;i++) { | | |
| Multicast CID | 12 | 12 LSBs of CID for multicast |
| } | | |
| MBS DIUC | 4 | |
| OFDMA symbol offset | 8 | OFDMA symbol offset with respect to start of the MBS portion |
| Subchannel offset | 6 | OFDMA subchannel offset with respect to start of the MBS portion |
| Boosting | 3 | |
| No. OFDMA symbols | 7 | The size of MBS data |
| No. subchannels | 6 | |
| Repetition coding indication | 2 | 0b00 = No repetition coding<br>0b01 = Repetition coding of 2 used<br>0b10 = Repetition coding of 4 used<br>0b11 = Repetition coding of 6 used |
| Next MBS frame offset | 8 | The Next MBS frame offset value is lower 8 bits of the frame number in which the BS shall transmit the next MBS frame. |
| Next MBS OFDMA symbol offset | 8 | The offset of the OFDMA symbol in which the next MBS portion starts, measured in OFDMA symbols from the beginning of the downlink frame in which the MBS-MAP is transmitted. |
| If (Next MBS MAP change indication = 1){ | | |
| Next MBS No. OFDMA symbols | 2 | It is to indicate the size of MBS_MAP message in Next MBS portion where the BS shall transmit the next MBS frame for multicast CIDs in this IE. |
| Next MBS No. OFDMA subchannels | 6 | It is to indicate the size of MBS_MAP message in Next MBS portion where the BS shall transmit the next MBS frame for multicast CIDs in this IE. |
| } | | |
| } | | |

In Table 3, MBS_DATA_IE informs of a multicast identifier corresponding to IE, MBS data reception location, and information required for decoding MBS data. MBS Burst Frame Offset of Table 3 indicates an offset from a frame in which a current MBS MAP message has been transmitted to a frame to which an MBS data burst is actually assigned. More specifically, MBS Burst Frame Offset has an offset of two to five frames including a frame in which a current MBS MAP message has been transmitted. Even if an MBS MAP message does not exist, a region where only MBS data bursts exist is included in an MBS region.

Next MBS Frame Offset is used to indicate a frame in which the next MBS MAP message is to be transmitted. That is, Next MBS Frame Offset indicates an offset from a frame in which a current MBS MAP message has been transmitted to a frame in which the next MBS MAP message is to be transmitted. Next MBS OFDMA symbol offset is used to indicate the starting location of an MBS MAP message (or starting point of an MBS region) inside a frame designated by Next MBS Frame Offset. That is, Next MBS OFDMA symbol offset indicates a relative value (OFDMA Symbol Offset) separated from the beginning of a relevant frame. Consequently, the location of an MBS MAP message indicates an MBS region because the MBS MAP message is located at the starting point of the MBS region.

In short, the location and information of an MBS data burst may be known through MBS_DATA_IE 109, and also a transmission time of the next MBS MAP message may be known in advance.

As described above, a terminal may know the following information by initially decoding MBS_MAP_IE one time at an arbitrary point, decoding an MBS MAP message indicated by MBS_MAP_IE, and decoding MBS_DATA_IE of the MBS MAP message.

The terminal may know a frame to which an MBS data burst of the relevant terminal is to be transmitted, the location/size of the MBS data burst inside the relevant frame, a frame to which the next MBS MAP message is to be transmitted, and the starting point of the MBS MAP message inside that frame.

If a base station makes a rule to position an MBS data burst location of a specific frame (frame designated by Next MBS Frame Offset of Table 3) at the starting point of an MBS region, a terminal may know the starting point of the MBS region even when not decoding MBS_MAP_IE anymore. That is, if the terminal initially decodes MBS_MAP_IE one time at an arbitrary point and repeats the above-described process, the terminal may continue to receive MBS data even when not receiving/decoding a DL MAP message any more. This operation is referred to as an MBS DaisyChain mechanism.

However, even the MBS DaisyChain mechanism has a limitation, which will be described with reference to FIG. 2.

Figure 2:
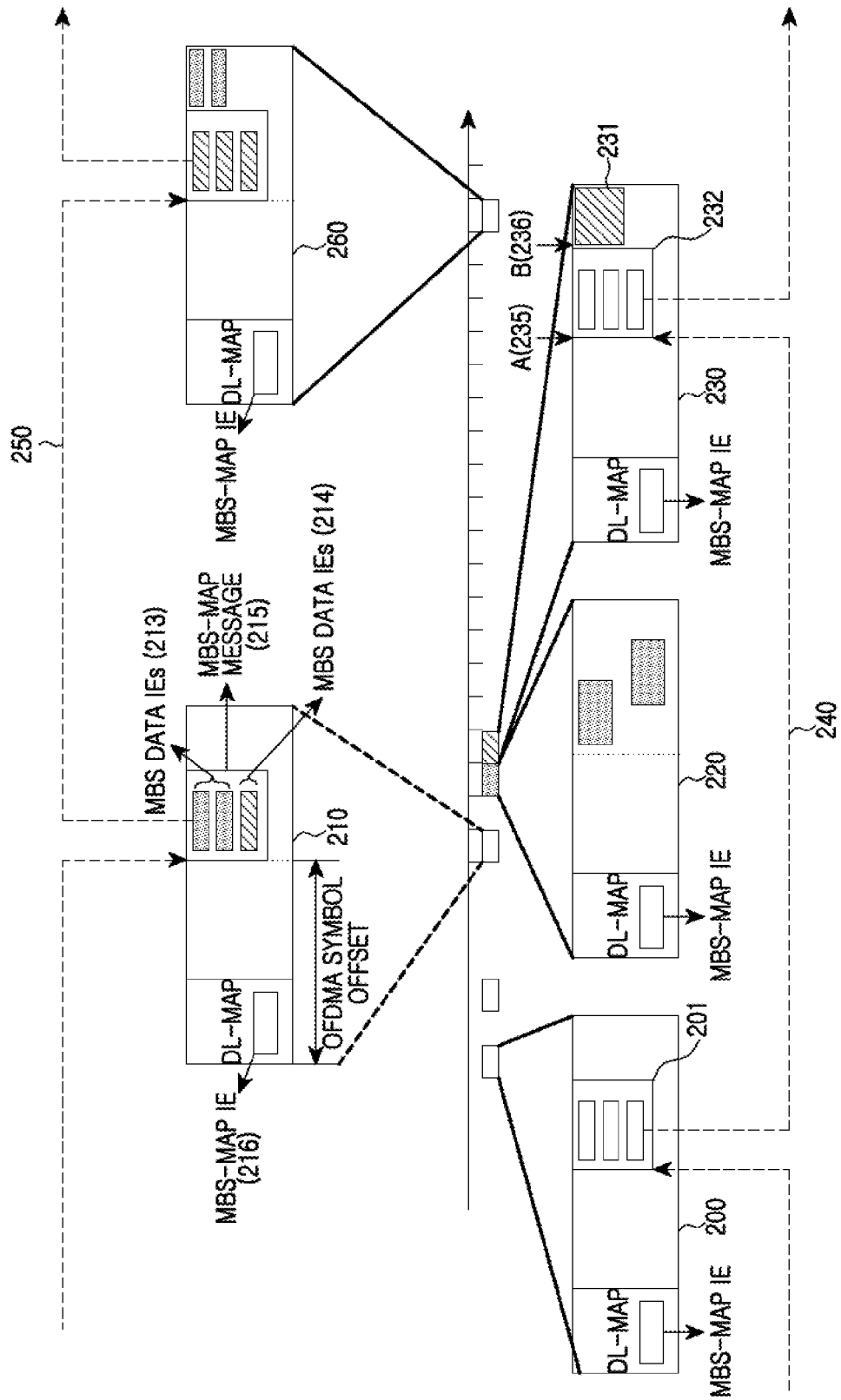
FIG. 2 illustrates an MBS DaisyChain mechanism in a broadband wireless communication system according to an exemplary embodiment of the present invention.

FIG. 2 illustrates an MBS DaisyChain mechanism in a broadband wireless communication system according to an exemplary embodiment of the present invention.

Referring to FIG. 2, from a middle frame 210, a terminal may know the starting point of an MBS region (i.e., location of an MBS MAP message 215) inside the same frame and decode the MBS MAP message 215 through MBS_MAP_IE 216 of a DL-MAP message. The MBS MAP message 215 has three MBS_DATA_IEs. Two MBS_DATA_IEs 213 indicate an MBS data burst location of a frame 220 separated by two frames from a current frame. As described with reference to Table 3, Next MBS Frame Offset field values of two MBS_DATA_IE 213 indicate (250) the location of the next MBS MAP message 260.

The other MBS_DATA_IE 214 indicates an MBS data burst location in a frame separated by three frames from a current frame. Also, a Next MBS Frame Offset field value of MBS_DATA_IE 214 may indicate a location different from the location of the next MBS MAP message designated by two MBS_DATA_IE 213. This is due to a transmission period difference between MBS channels. However, in FIG. 2, it is assumed that the Next MBS Frame Offset field value is the same as the location of the next MBS MAP message designated by two MBS_DATA_IE 213.

As inferred from the above description, according to the transmission periods of MBS data bursts, that is, the transmission period of an MBS channel, an MBS MAP message for different MBS data bursts (i.e., a different MBS channel) may be located in an MBS region to which MBS data bursts are transmitted. For example, a message including not only an MBS data burst 231 by MBS_Data_IE 214 but also a frame 230 which is indicated by MBS_DATA_IE of MBS MAP message 201 of a frame 200 and to which the next MBS MAP message is to be transmitted (240) is transmitted, so that an MBS MAP message 232 for a different MBS channel may coexist in an MBS region of a third frame 230 to be transmitted. In this case, when, of MBS data bursts, the starting point of an MBS data burst 231 closest to the starting portion of a frame is recognized as the starting point of an MBS region by the MBS DaisyChain mechanism, the location of an actual MBS region is a location A 235 but a terminal recognizes the location of the MBS region as a location B 236 by the MBS DaisyChain mechanism. Therefore, mismatch of an MBS region occurs. In other words, since the terminal which has decoded the MBS MAP message 215 of the frame 210 does not decode MBS_MAP_IE and MBS MAP message/MBS_DATA_IE of a previous frame 200 or 220, the terminal cannot recognize existence of an MBS MAP message 232 located in front of the MBS data burst 231. Therefore, recognizing the starting point of an MBS data burst closest to the beginning of a frame as the starting point of an MBS region using the MBS DaisyChain mechanism has a limitation.

When the terminal cannot accurately recognize the starting point of an MBS region, the terminal estimates a channel erroneously and cannot decode an MBS data burst properly.

In the description below, an exemplary method for informing of mismatch information of the MBS region at a point of the MBS region mismatch in order to address a limitation of the MBS DaisyChain mechanism is described.

As a first exemplary embodiment, the following parameter is added to MBS_DATA_IE of Table 3.

TABLE 4

| Syntax | size (bits) | Notes |
| --- | --- | --- |
| Read_MBS_MAP_IE | 1 | When this is set to 1, MS shall decode MBS MAP IE in DL-MAP message in the frame designated by MBS Burst Frame Offset |

Here, even when the MBS DaisyChain mechanism is performed, when a terminal decodes MBS_DATA_IE, if this parameter is set to 1, Read_MBS_MAP_IE denotes that an MBS MAP message exists in an MBS region of a frame designated by an MBS Burst Frame Offset, or the starting point of an MBS data burst closest to the beginning of a frame is not the same as the starting point of an MBS region. Accordingly, the terminal decodes MBS_MAP_IE (refer to Table 1) inside a DL MAP message to recognize the starting point of the MBS region. If this parameter is set to 0, Read_MBS_MAP_IE denotes the starting point of the MBS data burst closest to the beginning of the frame is the same as the starting point of the MBS region.

As a second exemplary embodiment, the following parameter is added to MBS_DATA_IE of Table 3.

TABLE 5

| Table 5 Syntax | size (bits) | Notes |
| --- | --- | --- |
| Real OFDMA Symbol Offset of MBS Permutation zone | 8 | The offset of the OFDMA symbol from the beginning of DL subframe to the starting point of MBS region in the frame designated by MBS Burst Frame Offset |

Here, Real OFDMA Symbol Offset of MBS Permutation zone denotes OFDMA Symbol Offset from the starting point of a frame designated by MBS Burst Frame Offset to an MBS region.

In the second exemplary embodiment, 'Real OFDMA Symbol Offset of MBS Permutation zone' has been added to MBS_DATA_IE. However, when there are a plurality of MBS_DATA_IE included in an MBS MAP message, if the plurality of MBS_DATA_IE are classified into several groups, that is, if some of MBS Data Bursts are located after two frames from a current frame, some of MBS data Bursts are located after three frames from the current frame, some of MBS data Bursts are located after four frames from the current frame, and some of MBS data Bursts are located after five frames from the current frame, then all MBS DATA IE unnecessarily have the same offset information. That is, as inferred from the above description, MBS Data Burst, which can be expressed using MBS Burst Frame Offset (2 bits), is located after 2, 3, 4, and 5 frames from the current frame.

As a third exemplary embodiment, the following parameter is added to an MBS MAP message of Table 2.

TABLE 6

| Table 6 Syntax | size (bits) | Notes |
|---|---|---|
| For (i=0; i<4; i++) { | | |
| Real OFDMA Symbol Offset of MBS Permutation zone[i] | 8 | The offset of the OFDMA symbol from the beginning of DL subframe to the starting point of MBS region in the frame designated by (n + 2 + i) frame. n frame: the frame in which MBS MAP message is transmitted. |
| } | | |

Here, Real OFDMA Symbol Offset of MBS Permutation zone[i] sequentially denotes OFDMA Symbol Offset values from the starting point of frames ($2^{nd}/3^{rd}/4^{th}/5^{th}$ frame offset from a current frame) designated by MBS Burst Frame Offset to an MBS region. Whenever a terminal decodes MBS_DATA_IE, the terminal extracts a relevant Real OFDMA Symbol Offset of MBS Permutation zone[i] value depending on an MBS Burst Frame Offset value of MBS_DATA_IE to recognize the starting point of an MBS region of a relevant frame. For example, if Burst Frame Offset is 2, that is, 2+2=4 frame offset, it is a $4^{th}$ frame offset of frames designated by MBS Burst Frame Offset, so that the terminal extracts an OFDMA Symbol Offset value of Real OFDMA Symbol Offset of MBS Permutation zone[2] to use the extracted value as the starting point of an MBS region of a relevant frame.

As a fourth exemplary embodiment, even if a terminal supports the MBS DaisyChain mechanism, the terminal may not support a base station. In this case, the following parameter is negotiated.

TABLE 7

| Table 7 Type | Length | Value |
|---|---|---|
| n | 1 | 0: DaisyChain MBS is not supported (default) 1: DaisyChain MBS is supported |

TLV encoding may be included in a message such as SBC-REQ/RSP. Depending on cases, negotiation may be performed using a similar message. For example, if the TLV is not included in a message used for negotiation, that is, if this parameter is 0, which is a default value, this parameter indicates that the MBS DaisyChain mechanism is not supported. Even if a terminal sends the parameter set to 1, when a base station does not include this parameter or sends the parameter set to 0, the base station indicates that it does not support the MBS DaisyChain mechanism. This indicates that the terminal uses a conventional MBS, not the MBS DaisyChain mechanism. Accordingly, as a conventional method, the terminal uses a method of recognizing an MBS region by decoding a DL MAP message and decoding MBS_MAP_IE included in the DL MAP message.

In the third exemplary embodiment described above, OFDMA Symbol Offset values of Real OFDMA Symbol Offset of MBS Permutation zone[i] from the starting point of frames ($2^{nd}/3^{rd}/4^{th}/5^{th}$ frame offset from a current frame) designated by MBS Burst Frame Offset to an MBS region are sequentially determined. However, if MBS_DATA_IE included in an MBS MAP message does not refer to all Real OFDMA Symbol Offset of MBS Permutation zone[i], a value not referred to may become an overhead. For example, if all MBS_DATA_IE of an MBS MAP message is located at a $2^{nd}$ frame offset, all MBS_DATA_IE refers to only Real OFDMA Symbol Offset of MBS Permutation zone[0]. At this point, Real OFDMA Symbol Offset of MBS Permutation zones [2], [3], and [4] become parameters which do not need to be transmitted. Therefore, according to a fifth exemplary embodiment, only Real OFDMA Symbol Offset of MBS Permutation zone which is referred by MBS_DATA_IE of an MBS MAP message needs to be included. For this purpose, the MBS MAP message of Table 6 is modified (added) as follows.

TABLE 8

| Table 8 Syntax | size (bits) | Notes |
|---|---|---|
| MBS Burst Frame Offset Indication | 4 | Bit #0: '1' indicates that there is MBS Permutation zone in the 2 frames hence. Bit #1: '1' indicates that there is MBS Permutation zone in the 3 frames hence. Bit #2: '1' indicates that there is MBS Permutation zone in the 4 frames hence. Bit #3: '1' indicates that there is MBS Permutation zone in the 5 frames hence. |
| For (i=0; i<4; i++) { if (Bit #Nth in MBS Burst Frame Offset Indication ==1) | | |
| Real OFDMA Symbol Offset of MBS Permutation zone in (n+i+2)th frame hence | 8 | The offset of the OFDMA symbol from the beginning of DL subframe to the starting point of MBS region in the frame designated by (n + 2 + i) frame. |
| } } | | |

Here, respective bits of MBS Burst Frame Offset Indication indicate whether MBS Permutation Zone exists in $2^{nd}/3^{rd}/4^{th}/5^{th}$ frame from a frame to which an MBS MAP message has been transmitted, respectively. That is, MBS Burst Frame Offset Indication is used to designate a frame including MBS Permutation zone to which a base station assigns an MBS data burst when the base station generates an MBS MAP.

Depending on each bit value of MBS Burst Frame Offset Indication, Real OFDMA Symbol Offset of MBS Permutation zone in (n+i+2)th frame hence, informing of the starting point of MBS Permutation zone in a relevant frame, is included. For example, if MBS Burst Frame Offset Indication is 0b0101, MBS Permutation zone is included after "N+2 frame" and "N+4 frame", so that the starting point of MBS Permutation zone for MBS Permutation zone located at "N+2 frame" and "N+4 frame" is included after MBS Burst Frame Offset Indication. Here, N is an index of a frame to which an MBS MAP message is transmitted.

Naturally, an MBS MAP message includes only MBS_DATA_IEs which refer to regions after an (N+2) frame and an (N+4) frame.

Selective acceptance of Real OFDMA Symbol Offset of MBS Permutation zone in (n+i+2)th frame hence, which is a parameter informing of the starting point of Permutation zone in the fifth exemplary embodiment, may be used differently. In the fifth exemplary embodiment, in the case where MBS Permutation zone exists, Real OFDMA Symbol Offset of MBS Permutation zone in (n+i+2)th frame hence is included unconditionally, and a relevant bit of MBS Burst Frame Offset Indication related thereto is set to 1. However, regarding a frame having a limitation that the location of an actual MBS region is a location A 235, but a terminal recognizes the location of the MBS region as a location B 236 due to the MBS DaisyChain mechanism, which is a limitation of the MBS DaisyChain mechanism described in FIG. 2, it is proposed to include Real OFDMA Symbol Offset of MBS Permutation zone in (n+i+2)th frame hence and set a relevant bit of MBS Burst Frame Offset Indication related thereto to 1 (a sixth exemplary embodiment). In this case, when decoding MBS_DATA_IE, in the case where a frame to which an MBS data burst is to be located and a mapped bit are 0 in MBS Burst Frame Offset Indication, a terminal recognizes there is no relevant Real OFDMA Symbol Offset of MBS Permutation zone in (n+i+2)th frame hence, and, like the MBS DaisyChain mechanism, recognizes the starting point of one of MBS data bursts (bursts indicated by MBS_MAP_IEs having the same MBS Burst Frame Offset) included in the same relevant frame, closest to the beginning of the frame as the starting point of an MBS region.

As revealed from here, unlike the fifth exemplary embodiment, a base station may incorporate MBS_DATA_IE into a frame not included in Real OFDMA Symbol Offset of MBS Permutation zone in (n+i+2)th frame hence informing of the starting point of MBS Permutation zone in a relevant frame using each bit value of MBS Burst Frame Offset Indication.

The above-described fifth exemplary embodiment addresses selective acceptance of Real OFDMA Symbol Offset of MBS Permutation zone in (n+i+2)th frame hence which is the parameter informing of the starting point of MBS Permutation zone. Similarly, the above-described sixth exemplary embodiment addresses selective acceptance. According to a seventh exemplary embodiment, information for the starting point of MBS Permutation zone is configured to TLV format, which will be described below.

Table 9 below represents a compound TLV format included in an MBS MAP message. A Sub TLV informing of the starting point of MBS Permutation zone is included in a value position of this Compound TLV.

TABLE 9

| Table 9 Type | Length | Value |
| --- | --- | --- |
| X | Variable | Compound TLV |

As described below, a point of MBS Permutation zone in a relevant frame may be recognized depending on Type of an included Sub TLV.

| Type | Length | Value |
| --- | --- | --- |
| X.2 | Variable | The offset of the OFDMA symbol from the beginning of DL subframe to the starting point of MBS region in the frame designated by (n + 2) frame. |

| Type | Length | Value |
| --- | --- | --- |
| X.3 | Variable | The offset of the OFDMA symbol from the beginning of DL subframe to the starting point of MBS region in the frame designated by (n + 3) frame. |

| Type | Length | Value |
| --- | --- | --- |
| X.4 | Variable | The offset of the OFDMA symbol from the beginning of DL subframe to the starting point of MBS region in the frame designated by (n + 4) frame. |

| Type | Length | Value |
| --- | --- | --- |
| X.5 | Variable | The offset of the OFDMA symbol from the beginning of DL subframe to the starting point of MBS region in the frame designated by (n + 5) frame. |

The method of the above-described sixth exemplary embodiment is applied to the seventh exemplary embodiment. That is, in the case where a frame indicated by MBS Burst Frame Offset of MBS MAP IE and a mapped Sub-TLV do not exist, a terminal may recognize the starting point of one of MBS data bursts (bursts indicated by MBS_MAP_IEs having the same MBS Burst Frame Offset) included in the same relevant frame, closest to the beginning of the frame as the starting point of an MBS region.

Exemplary operations of a base station and a terminal will be described below on the basis of the above description.

Figure 3:
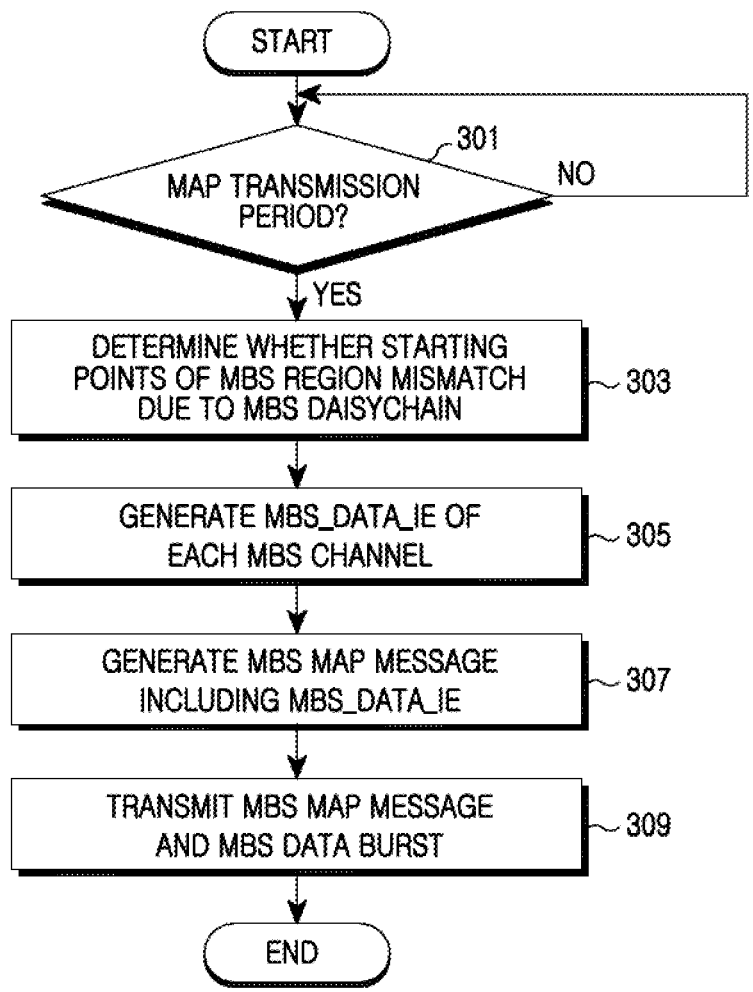
FIG. 3 illustrates a flowchart illustrating a procedure for operating a base station in a broadband wireless communication system according to an exemplary embodiment of the present invention.

FIG. 3 illustrates a procedure for operating a base station in a broadband wireless communication system according to an exemplary embodiment of the present invention. Initially, it is assumed that the base station can transmit an MBS data burst without encoding a DL MAP message using the MBS DaisyChain mechanism.

Referring to FIG. 3, in step 301, the base station determines whether it is a transmission period of an MBS MAP message. That is, the MBS MAP message is transmitted at a preset period and the base station determines a frame in which the MBS MAP message should be transmitted based on the period.

Here, the period is influenced by an MBS Burst Frame Offset field value and a Next MBS Frame Offset field value of MBS_DATA_IE.

If the base station determines that it is the transmission period of the MBS MAP message, the base station determines whether the starting points of MBS regions mismatch by the MBS DaisyChain mechanism in step 303.

For example, as described in FIG. 2, when the location of the next MBS MAP message (called a first MBS region) by the Next MBS Frame Offset field value of MBS_DATA_IE, and the location of an MBS data burst (called a second MBS region) assigned to a relevant frame by an MBS Burst Frame Offset field are applied to the same frame, the starting points of the MBS regions mismatch with each other. Therefore, the base station may determine a point at which the first MBS region and the second MBS region are applied to the same frame by considering an MBS MAP transmission period through scheduling.

In step 305, the base station incorporates information indicating whether MBS regions mismatch (first exemplary embodiment), or information informing of the starting point of an actual MBS region (second and third exemplary embodiments) to generate at least one MBS_DATA_IEs for each MBS channel. That is, the base station generates MBS_DATA_IE including transmission period information and start offset information of an MBS data burst, and transmission period information and start offset information of an MBS MAP message with respect to each MBS channel. For example, MBS_DATA_IE is configured as in Table 4 or Table 5. For reference, if MBS regions match with each other, MBS_DATA_IE may be configured as in Table 3 like the conventional art.

Also, information informing of whether MBS Permutation Zone exists in a relevant frame may be included using MBS Burst Frame Offset Indication (fifth embodiment, refer to Table 8). In an exemplary realization, the fifth exemplary embodiment is applied to only a frame where MBS regions do not match with each other by the MBS DaisyChain mechanism, and information is included according to the sixth exemplary embodiment. In an exemplary realization, the fifth and sixth exemplary embodiments may be included in the form of a Compound TLV (refer to Table 9).

After generating MBS_DATA_IE, the base station generates an MBS MAP message including at least one above-generated MBS_DATA_IE in step 307. At this point, in case of informing of the transmission point of the next MBS MAP message through the MBS MAP message, the base station generates an MBS MAP message including the at least one MBS_DATA_IE and transmission point information of the next MBS MAP message. An example of the MBS MAP message is given by Table 2.

After generating the MBS MAP message, the base station transmits the MBS MAP message and then transmits MBS data bursts according to the information of the MBS MAP message in step 309.

After that, the base station ends the present exemplary algorithm.

According to the third exemplary embodiment, when MBS_DATA_IE are classified into a plurality of groups, a terminal determines that the starting points of MBS regions do not match with each other in step 303, configures MBS_DATA_IE as in Table 3 in step 305, and configures an MBS MAP message as in Table 6 in step 307.

Figure 4:
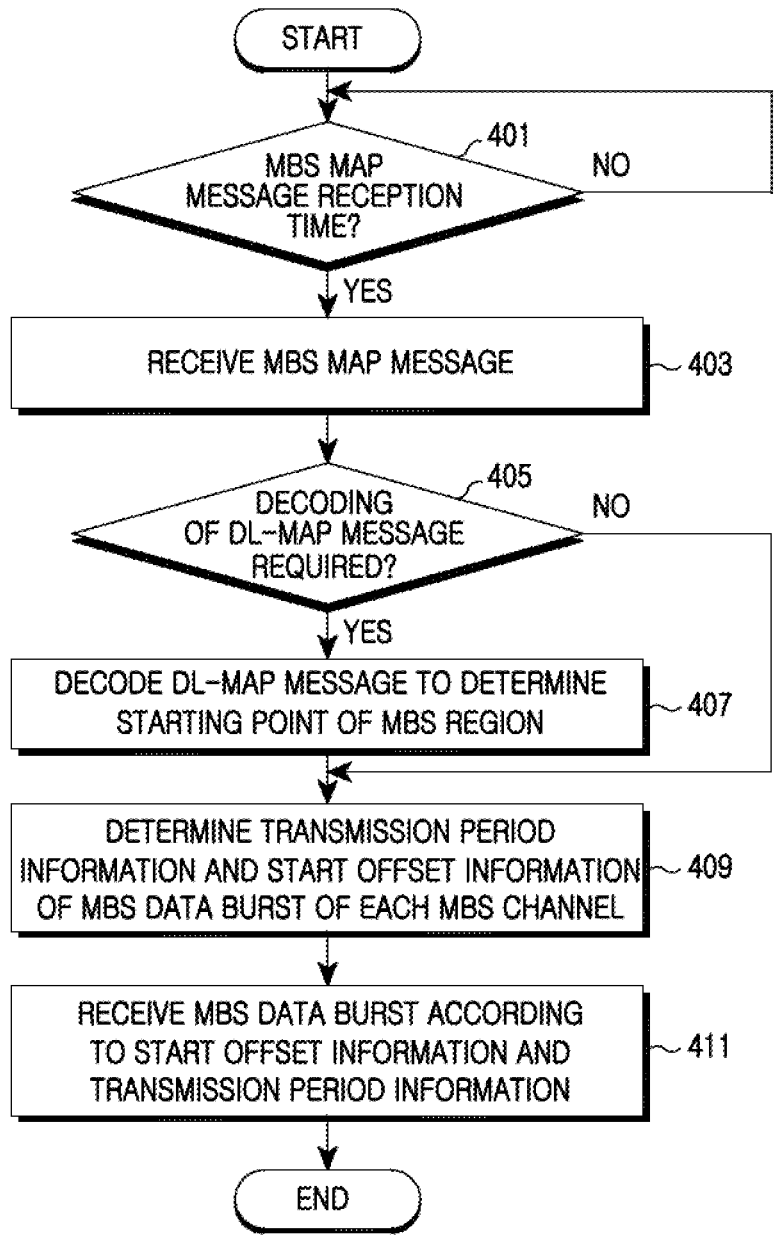
FIG. 4 illustrates a flowchart illustrating a procedure for operating a terminal in a broadband wireless communication system according to an exemplary embodiment of the present invention.

FIG. 4 illustrates a procedure for operating a terminal in a broadband wireless communication system according to an exemplary embodiment of the present invention.

Referring to FIG. 4, in step 401, the terminal determines whether the frame is a frame where an MBS MAP message is received. Here, the MBS MAP message is periodically received. The reception point of the MBS MAP message is determined through a previous MBS MAP message or using a frame number.

If it is the reception point of the MBS MAP message, the terminal receives and reads the MBS MAP message in step 403. Here, the MBS MAP message includes at least one MBS_DATA_IE. In a case of informing of the transmission point of the next MBS MAP message through the MBS MAP message, the MBS MAP message includes the at least one MBS_DATA_IE and the transmission point information of the next MBS MAP message. An example of the MBS MAP message configuration is given by Table 2 or Table 6.

After receiving the MBS MAP message, the terminal determines whether decoding a DL MAP message is required through a Read_MBS_MAP_IE field value of MBS_DATA_IE in step 405. That is, if the Read_MBS_MAP_IE value is 1, it denotes that there exists an MBS MAP message in an MBS region of a frame designated by MBS Burst Frame Offset, or the starting point of an MBS data burst closest to the beginning of a frame is not the same as the starting point of an MBS region. If the Read_MBS_MAP_IE value is 0, it denotes that the starting point of the MBS data burst closest to the beginning of the frame is the same as the starting point of the MBS region.

If it is determined that the starting point of the MBS data burst closest to the beginning of the frame is not the same as the starting point of the MBS region in step 405, the terminal decodes MBS_MAP_IE (refer to Table 1) of a DL MAP message to determine the location and coding information of the MBS MAP message and recognize information included in the MBS MAP message in step 407. That is, the terminal recognizes the starting point of the MBS region.

In contrast, if the starting point of the MBS data burst closest to the beginning of the frame is the same as the starting point of the MBS region in step 405, the terminal uses the starting point of the MBS region.

In step 409, the terminal determines start offset information and transmission period information of an MBS data burst of each MBS channel through the at least one MBS_DATA_IE. That is, an MBS data burst of each MBS channel may be periodically transmitted, and one MBS_DATA_IE includes start offset information of an MBS data burst and transmission period information for one MBS channel. Here, the start offset information denotes a frame offset from a frame in which the MBS MAP message is received to a frame in which a first MBS data burst of a relevant MBS channel is to be received. For example, MBS_DATA_IE is configured as in Table 4.

In step 411, the terminal receives an MBS data burst according to the above-determined start offset information of the MBS data burst and the transmission period information of each MBS channel during a valid section of the received MBS MAP message. For example, in case of receiving an MBS channel 1, the terminal receives an MBS data burst of the MBS channel 1 after a frame portion corresponding to the start offset determined through MBS_DATA_IE for the MBS channel 1 elapses, and continues to receive an MBS data burst of the MBS channel 1 according to the transmission period.

After that, the terminal ends the present exemplary algorithm.

Figure 5:
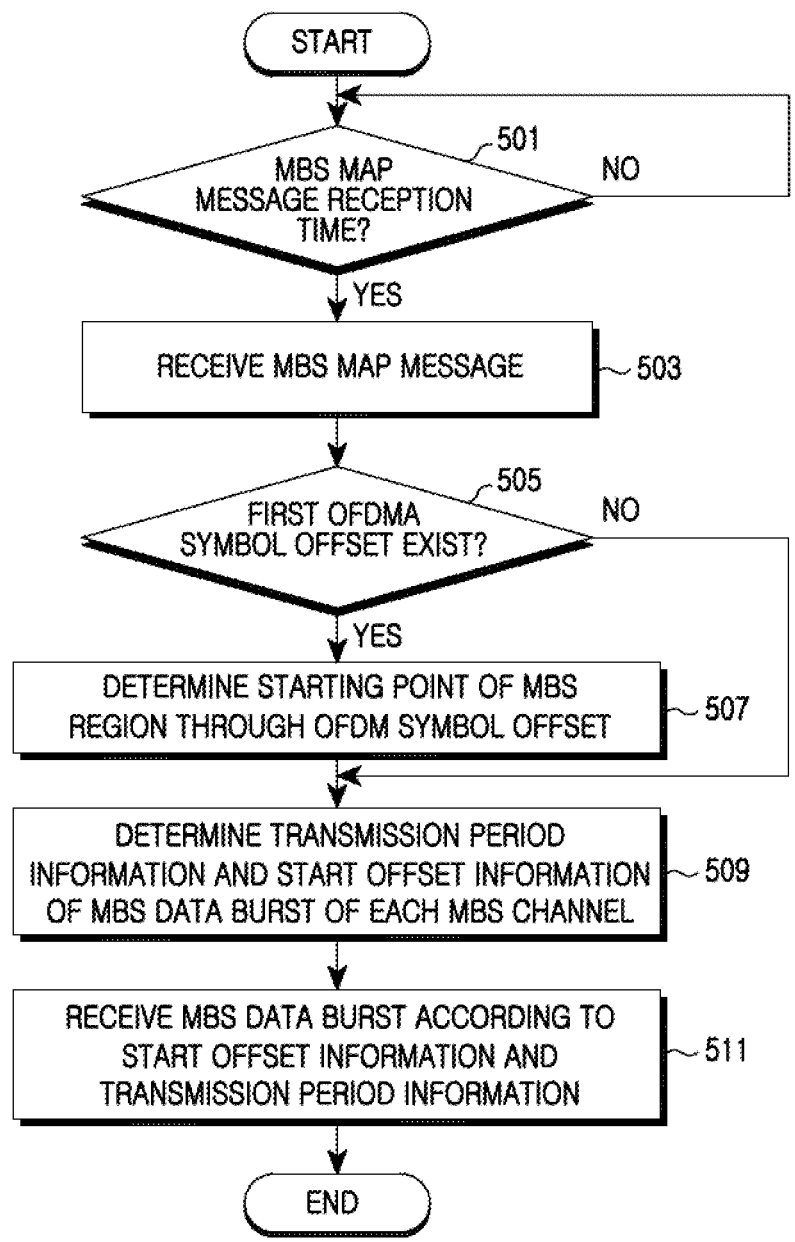
FIG. 5 illustrates a flowchart illustrating a procedure for operating a terminal in a broadband wireless communication system according to an exemplary embodiment of the present invention.

FIG. 5 illustrates a procedure for operating a terminal in a broadband wireless communication system according to an exemplary embodiment of the present invention.

Referring to FIG. 5, in step 501, the terminal determines whether this frame is a frame where an MBS MAP message is received.

If it is the reception point of the MBS MAP message, the terminal receives and reads the MBS MAP message in step 503.

After receiving the MBS MAP message, the terminal determines a first OFDMA Symbol Offset from the starting point of a frame designated by MBS Burst Frame Offset to an MBS region through a Real OFDMA Symbol Offset of MBS Permutation zone field value of MBS_DATA_IE in step 505. That is, the terminal determines the starting point of the MBS region.

If it is determined that the first OFDMA Symbol Offset exists in step 505, the terminal decodes MBS_DATA_IE (refer to Table 5) included inside a DL MAP message to determine the starting point of the MBS region in step 507.

In contrast, if the first OFDMA Symbol Offset does not exist in step 505, MBS_DATA_IE is configured as in Table 3.

In step 509, the terminal determines start offset information and transmission period information of an MBS data burst of each MBS channel through the at least one MBS_DATA_IE. That is, an MBS data burst of each MBS channel may be periodically transmitted, and one MBS_DATA_IE includes start offset information of an MBS data burst and transmission period information for one MBS channel. Here, the start offset information denotes a frame offset from a frame in which the MBS MAP message is received to a frame in which a first MBS data burst of a relevant MBS channel is to be received.

In step 511, the terminal receives an MBS data burst according to the above-determined start offset information of the MBS data burst and the transmission period information of each MBS channel during a valid section of the received MBS MAP message.

After that, the terminal ends the present exemplary algorithm.

Figure 6:
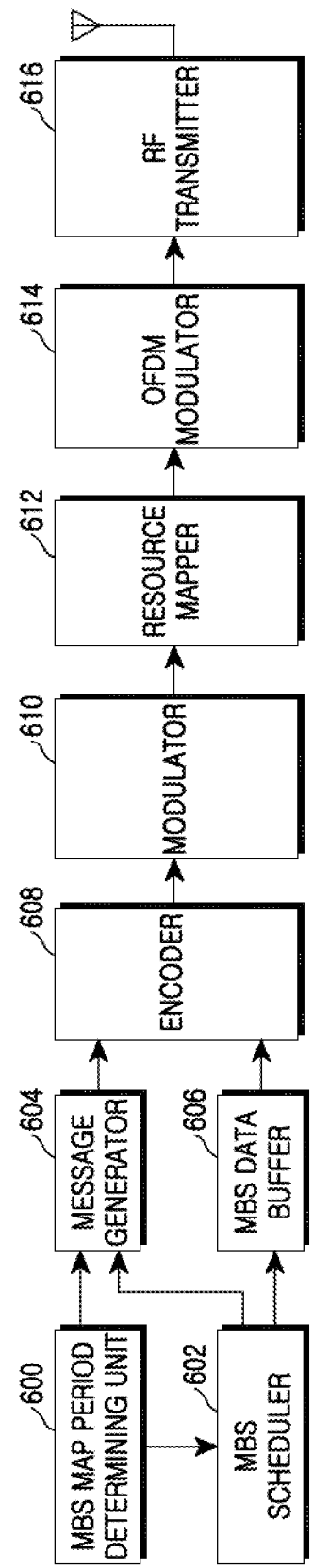
FIG. 6 illustrates a block diagram illustrating a base station in a broadband wireless communication system according to an exemplary embodiment of the present invention.

FIG. 6 is a block diagram illustrating a base station in a broadband wireless communication system according to an exemplary embodiment of the present invention.

Referring to FIG. 6, the base station includes an MBS MAP period determining unit 600, an MBS scheduler 602, a message generator 604, an MBS data buffer 606, an encoder 608, a modulator 610, a resource mapper 612, an OFDM modulator 614, and a Radio Frequency (RF) transmitter 616.

The MBS MAP period determining unit 600 determines a point at which an MBS MAP message is to be transmitted. For example, the MBS MAP period determining unit 600 may perform a modulo operation on a frame number using a transmission period, and determine a frame having the modulo operation value of '0' as the transmission point of the MBS MAP message. In the case where the transmission point of the MBS MAP message arrives, the MBS MAP period determining unit 600 informs the MBS scheduler 602 and the message generator 604 of the transmission point of the MBS MAP message. That is, the MBS MAP message is transmitted by a preset period, and the MBS MAP period determining unit 600 determines whether this frame is a frame in which the MBS MAP message should be transmitted.

The MBS scheduler 602 is in charge of scheduling for an MBS, and manages transmission scheduling information of an MBS data burst. According to an exemplary embodiment, the MBS scheduler 602 provides information for generating an MBS MAP message to the message generator 604. That is, when the transmission point of the MBS MAP message is provided from the MBS MAP period determining unit 600, the MBS scheduler 602 determines whether the transmission period of an MBS data burst and the transmission period of an MBS MAP message for other MBS data bursts are applied to the same frame.

The message generator 604 generates a MAC management message to be transmitted to a terminal. For example, the message generator 604 generates a DL MAP message including DL resource assignment information (MAP_IE) and assignment information (MBS_MAP_IE) of an MBS region and an MBS MAP message, and an MBS MAP message. More particularly, the message generator 604 generates the MBS MAP message using start offset information of an MBS data burst and transmission period information of each MBS channel provided from the MBS scheduler 604. That is, the message generator 604 generates at least one MBS_DATA_IE including start offset information of an MBS data burst and transmission period information of each MBS channel. For example, MBS_DATA_IE is configured as in Table 4 or Table 5. Also, the message generator 604 generates an MBS MAP message including the at least one MBS_DATA_IE. At this point, in a case of informing of the transmission point of the next MBS MAP message through an MBS MAP message, the message generator 604 generates an MBS MAP message including the at least one MBS_DATA_IE and the transmission point of the next MBS MAP message. Here, the transmission point information of the next MBS MAP message is expressed using a frame number of a frame including the next MBS MAP message.

The MBS data buffer 606 temporarily stores MBS data to be transmitted, and outputs stored MBS data under control of the MBS scheduler 602.

The encoder 608 of a physical layer encodes a signaling message from the message generator 604 and a data burst from the MBS data buffer 606 according to a Modulation and Coding Scheme (MCS) level. Here, the encoder 608 may use a Convolution Code (CC), a Turbo Code (TC), a Convolution Turbo Code (CTC), a Low Density Parity Check (LDPC) code, and the like. The modulator 610 modulates an encoded packet from the encoder 608 according to the MCS level to generate modulated symbols. For example, the modulator 610 may use Quadrature Phase-Shift Keying (QPSK), 16 Quadrature Amplitude Modulation (16 QAM), 64 QAM, and the like.

The resource mapper 612 maps data from the modulator 610 to a preset resource (or subcarrier). The OFDM modulator 614 performs OFDM modulation on resource-mapped data from the resource mapper 612 to generate an OFDM symbol. Here, the OFDM modulation includes an Inverse Fast Fourier Transform (IFFT) operation, Cyclic Prefix (CP) insertion, and the like. The RF transmitter 616 converts sample data from the OFDM modulator 614 into an analog signal, and converts the analog signal into an RF signal to transmit the RF signal via an antenna.

Figure 7:
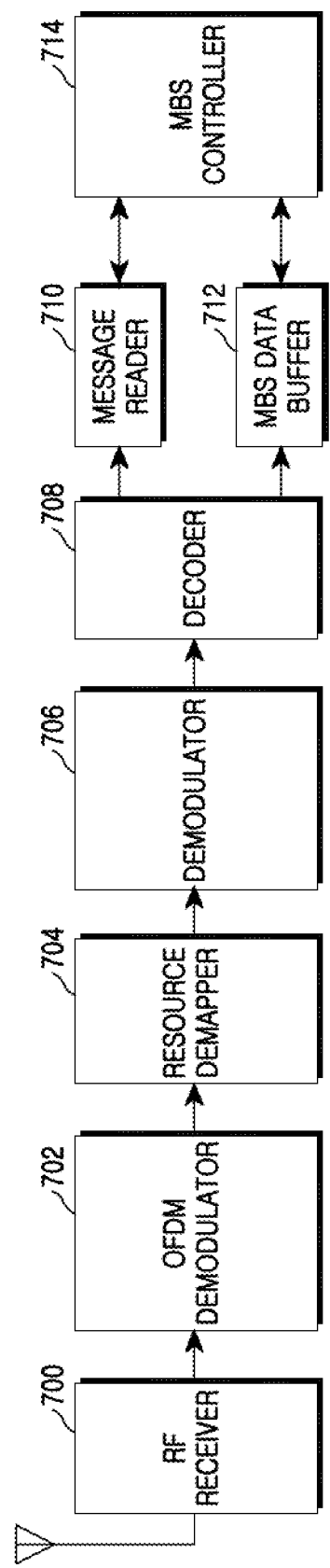
FIG. 7 illustrates a block diagram illustrating a terminal in a broadband wireless communication system according to an exemplary embodiment of the present invention.

FIG. 7 is a block diagram illustrating a terminal in a broadband wireless communication system according to an exemplary embodiment of the present invention.

Referring to FIG. 7, the terminal includes an RF receiver 700, an OFDM demodulator 702, a resource demapper 704, a demodulator 706, a decoder 708, a message reader 710, an MBS data buffer 712, and an MBS controller 714.

The RF receiver 700 converts an RF signal received via an antenna into a baseband signal, and converts the baseband signal into digital sample data. The OFDM demodulator 702 performs OFDM demodulation on the digital sample data from the RF receiver 700 to output data in a frequency domain. Here, the OFDM demodulation includes CP cancellation, a Fast Fourier Transform (FFT) operation, and the like. The resource demapper 704 extracts a burst to be demodulated from the data in the frequency domain from the OFDM demodulator 703.

The demodulator 706 demodulates the burst from the resource demapper 704. The decoder 708 decodes data demodulated by the demodulator 706. At this point, if a decoded packet is a signaling message, the signaling message is provided to the message reader 710. If a decoded packet is an MBS traffic, the packet is provided to the MBS data buffer 712.

The message reader 710 reads a control message received from a base station. Also, the message reader 710 provides information recognized from an MBS related control message to the MBS controller 714. Here, the MBS related control message includes a DL MAP message including MBS_MAP_IE, and an MBS MAP message. More particularly, the message reader 710 determines information for determining assignment information of an MBS data burst and the starting point of an MBS region of each channel from at least one MBS_DATA_IE included in the MBS MAP message. That is, an MBS data burst of each MBS channel may be periodically transmitted, and one MBS_DATA_IE includes start offset information of an MBS data burst and transmission period information for one MBS channel. Here, the start offset information denotes a frame offset from a frame in which the MBS MAP message is received to a frame in which a first MBS data burst of a relevant MBS channel is to be received. For example, MBS_DATA_IE is configured as in Table 4 or Table 5.

The MBS controller 714 controls the operation of the terminal to receive an MBS data burst. That is, the MBS controller 714 controls to receive an MBS data burst according to assignment information of an MBS data burst provided from the message reader 710. More specifically, the MBS controller 714 determines the reception point of an MBS MAP message. That is, the MBS MAP message is periodically received. The reception point of the MBS MAP message may be determined through a previous MBS MAP message or using a frame number. However, in the case where the terminal continues to perform communication, the terminal may recognize the reception point of the MBS MAP message through a DL MAP received every frame.

If it is the reception point of the MBS MAP message, the MBS controller 714 controls the resource demapper 704 to extract a DL MAP message and an MBS MAP message. Here, the MBS MAP message includes at least one MBS_DATA_IE. In case of informing of the transmission point of the next MBS MAP message through an MBS MAP message, the MBS MAP message includes the at least one MBS_DATA_IE and transmission point information of the next MBS MAP message. An example of the MBS MAP message configuration is given by Table 2. Accordingly, the MBS controller 714 controls the resource (subcarrier) demapper 704 to extract an MBS data burst according to assignment information of an MBS data burst of each channel, that is, start offset information and transmission period information of each channel during a valid section of a received MBS MAP message. For example, in case of receiving an MBS channel 1, the MBS controller 714 controls to extract an MBS data burst of the MBS channel 1 after a frame portion corresponding to a start offset determined through MBS_DATA_IE of the MBS channel 1 elapses, and controls to continue to extract an MBS data burst of the MBS channel 1 according to a transmission period.

The MBS data buffer 712 temporarily stores MBS data received from a base station, and provides the MBS data to a block of a relevant application layer.

As described above, exemplary embodiments of the present invention may reduce a decoding loss of an MBS data burst caused by an MBS region mismatch by transmitting an MBS MAP message including information informing of an MBS region mismatch point in a broadband wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station to recognize a Multicast and Broadcast Service (MBS) region in a broadband wireless communication system, the method comprising:
   recognizing a mismatch of an MBS region, when a location of a next MBS MAP message of a first frame and a location of an MBS data burst indicated by MBS burst assignment information of a second frame coexist in a third frame;
   generating a control message comprising information for indicating a decoding of a starting point of the MBS region in a downlink (DL)_MAP message; and
   transmitting the generated control message during one of the first and second frames,
   wherein the starting point of the MBS region is recognized as the location of the MBS data burst indicated by the MBS burst assignment information of the second frame.

2. The method of claim 1, wherein the MBS region comprises an MBS MAP message and an MBS data burst region.

3. The method of claim 1, wherein the information for indicating a decoding of the starting point of the MBS region comprises information informing of whether a starting point of an MBS data burst closest to a beginning of the third frame to be transmitted is the same as the starting point of the MBS region.

4. The method of claim 3, further comprising:
   when the starting point of the MBS data burst closest to the beginning of the third frame to be transmitted is not the same as the starting point of the MBS region, encoding a DownLink (DL) MAP message to allow a terminal to recognize the starting point of the MBS region; and
   when the starting point of the MBS data burst closest to the beginning of the third frame to be transmitted is the same as the starting point of the MBS region, allowing the terminal to recognize the starting point of the MBS data burst as the starting point of the MBS region without decoding the DL MAP message.

5. The method of claim 1, wherein the information for indicating a decoding of the starting point of the MBS region comprises offset information from a DL subframe to the starting point of the MBS region in the third frame.

6. The method of claim 1, wherein the information for indicating a decoding of the starting point of the MBS region comprises offset information from a DL subframe to a starting point of an MBS region for each MBS Burst Frame Offset.

7. The method of claim 6, wherein the information for indicating a decoding of the starting point of the MBS region further comprises information indicating whether an offset value from the DL subframe to the starting point of the MBS region for each MBS Burst Frame Offset exists.

8. The method of claim 6, wherein the offset information from the DL subframe to the starting point of the MBS region for each MBS Burst Frame Offset is incorporated in the form of a Compound Type-Length-Value (TLV) included in an MBS MAP message.

9. A base station apparatus for recognizing a Multicast and Broadcast Service (MBS) region in a broadband wireless communication system, the apparatus comprising:
   a processor configured to recognize a mismatch of an MBS region, when a location of a next MBS MAP message of a first frame and a location of an MBS data burst indicated by MBS burst assignment information of a second frame coexist in a third frame, and
   generate a control message comprising information for indicating a decoding of a starting point of the MBS region in a downlink (DL)_MAP message; and
   a transmitter configured to transmit the generated control message during one of the first and second frames,
   wherein the starting point of the MBS region is recognized as the location of the MBS data burst indicated by the MBS burst assignment information of the second frame.

10. The apparatus of claim 9, wherein the MBS region comprises an MBS MAP message and an MBS data burst region.

11. The apparatus of claim 9, wherein the information for indicating a decoding of the starting point of the MBS region comprises information informing of whether a starting point of an MBS data burst closest to a beginning of the third frame to be transmitted is the same as the starting point of the MBS region.

12. The apparatus of claim 11, wherein when the starting point of the MBS data burst closest to the beginning of the third frame to be transmitted is not the same as the starting point of the MBS region, the processor is configured to encode a DownLink (DL) MAP message to allow a terminal to recognize the starting point of the MBS region, and
   when the starting point of the MBS data burst closest to the beginning of the third frame to be transmitted is the same as the starting point of the MBS region, the processor is configured to allow the terminal to recognize the starting point of the MBS data burst as the starting point of the MBS region without decoding the DL MAP message.

13. The apparatus of claim 9, wherein the information for indicating a decoding of the starting point of the MBS region comprises offset information from a DL subframe to the starting point of the MBS region in the third frame.

14. The apparatus of claim 9, wherein the information for indicating a decoding of the starting point of the MBS region comprises offset information from a DL subframe to the starting point of the MBS region for each MBS Burst Frame Offset.

15. The apparatus of claim 14, wherein the information for indicating a decoding of the starting point of the MBS region further comprises information indicating whether an offset value from the DL subframe to the starting point of the MBS region for each MBS Burst Frame Offset exists.

16. The apparatus of claim 15, wherein the offset information from the DL subframe to the starting point of the MBS region for each MBS Burst Frame Offset is incorporated in the form of a Compound Type-Length-Value (TLV) included in an MBS MAP message.

* * * * *